United States Patent
Lin et al.

(10) Patent No.: US 10,067,378 B2
(45) Date of Patent: Sep. 4, 2018

(54) DOUBLE-SIDED DISPLAY

(71) Applicants: BOE TECHNOLOGY GROUP CO., LTD., Beijing (CN); BEIJING BOE DISPLAY TECHNOLOGY CO., LTD., Beijing (CN)

(72) Inventors: Lifeng Lin, Beijing (CN); Hongming Zhan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 65 days.

(21) Appl. No.: 15/251,328

(22) Filed: Aug. 30, 2016

(65) Prior Publication Data

US 2017/0199428 A1 Jul. 13, 2017

(30) Foreign Application Priority Data

Jan. 11, 2016 (CN) .......................... 2016 1 0016214

(51) Int. Cl.
*G02F 1/1333* (2006.01)
*G02F 1/13363* (2006.01)
*G02F 1/1343* (2006.01)
*G02F 1/1335* (2006.01)
*G02F 1/137* (2006.01)

(52) U.S. Cl.
CPC ........ *G02F 1/133555* (2013.01); *G02F 1/137* (2013.01); *G02F 1/13363* (2013.01); *G02F 1/133528* (2013.01); *G02F 1/134336* (2013.01); *G02F 2001/133342* (2013.01); *G02F 2001/133638* (2013.01); *G02F 2001/134345* (2013.01); *G02F 2201/121* (2013.01); *G02F 2201/123* (2013.01); *G02F 2203/01* (2013.01);

(Continued)

(58) Field of Classification Search
CPC ..... H01L 27/3267; G02F 2001/133342; G02F 2001/133541; G02F 1/133528; G02F 1/133555; G02F 1/13363; G02F 2202/40; G02F 2001/133638; G02B 5/3033; G02B 5/3025; G02B 5/3083; Y10T 428/1041
See application file for complete search history.

(56) References Cited

U.S. PATENT DOCUMENTS 8,279,510 B2 * 10/2012 Kuhlman .............. G02F 1/1347
359/227
2003/0063243 A1 * 4/2003 Roosendaal ...... G02F 1/133553
349/113

(Continued)

FOREIGN PATENT DOCUMENTS

| CN | 1624532 A | 6/2005 |
|---|---|---|
| CN | 1680857 A | 10/2005 |
| CN | 1690785 A | 11/2005 |

OTHER PUBLICATIONS

First Chinese Office Action dated Aug. 3, 2016; Appln. No. 201610016214.7.

*Primary Examiner* — Jia Pan
(74) *Attorney, Agent, or Firm* — Ladas & Parry LLP (57) ABSTRACT

A double-sided display is provided. The double-sided display comprises: a display panel, and a first reflective layer and a second reflective layer respectively arranged on both sides of the display panel, and light conversion layers arranged on an outer side of the first reflective layer and an outer side of the second reflective layer.

13 Claims, 4 Drawing Sheets

(52) U.S. Cl.
CPC ...... *G02F 2413/01* (2013.01); *G02F 2413/05* (2013.01)

(56) References Cited

U.S. PATENT DOCUMENTS

2005/0225705 A1* 10/2005 Chae ................ G02F 1/133555
  349/114
2015/0346536 A1* 12/2015 Wang ................ G02F 1/13362
  349/68
2016/0048058 A1*  2/2016 Xu .................... G02F 1/1333
  349/61

* cited by examiner

Transmissive region a      Reflecting region b

FIG. 4

Transmissive region a    Reflecting region b

FIG. 5

Transmissive region a    Reflecting region b

FIG. 6

Transmissive region a    Reflecting region b

DOUBLE-SIDED DISPLAY

TECHNICAL FIELD

Embodiments of the present disclosure relate to a double-sided display.

BACKGROUND

At present, most of displays in the market are single-sided displays; however, in many occasions, for example, in an advertisement playing facility of public places such as a digital signage, an electronic communication equipment, a cash register facility, an inquiry window facility, an exhibition hall and so on, it is often necessary that an image displayed by a display panel is viewed by people on both sides of the display panel at the same time.

Generally, a double-sided display is a combination of two independent display panels and their backlights, in which an internal structure and a driving system for driving the two independent display panels to display are complicated; and thus, not only fabricating cost of the double-sided display is greatly increased, but also a thickness of the double-sided display is increased, which is not in line with a trend of making the display panel light and thin.

SUMMARY

According to the embodiments of the disclosure, a double-sided display is provided. The double-sided display comprises: a display panel, and a first reflective layer and a second reflective layer respectively arranged on both sides of the display panel, and light conversion layers arranged on an outer side of the first reflective layer and an outer side of the second reflective layer. The first reflective layer includes transmissive regions and reflecting regions, the second reflective layer includes transmissive regions and reflecting regions, the transmissive regions of the first reflective layer correspond to the reflecting regions of the second reflective layer, and the reflecting regions of the first reflective layer correspond to the transmissive regions of the second reflective layer. The light conversion layers are configured to convert an incident ambient light to a linearly polarized light, and convert the linearly polarized light to a right-circularly polarized light and filter out a left-circularly polarized light; or, the light conversion layers are configured to convert the incident ambient light to the linearly polarized light, and convert the linearly polarized light to the left-circularly polarized light and filter out the right-circularly polarized light.

For example, each of the light conversion layers includes a polarizer and a quarter-wave plate, the polarizer is located on an outer side of the light conversion layer, and the quarter-wave plate is located between the polarizer and the display panel.

For example, in the first reflective layer and the second reflective layer, the reflecting regions and the transmissive regions are arranged alternately.

For example, in the first reflective layer and the second reflective layer, a size of each reflecting region and a size of each transmissive region respectively correspond to an integral number of pixel regions of the display panel.

For example, in the first reflective layer and the second reflective layer, the size of each reflecting region and the size of each transmissive region respectively correspond to one pixel region of the display panel.

For example, in the first reflective layer and the second reflective layer, the size of each reflecting region and the size of each transmissive region respectively correspond to a row of pixel regions of the display panel.

For example, in the first reflective layer and the second reflective layer, the size of each reflecting region and the size of each transmissive region respectively correspond to a half row of pixel regions of the display panel.

For example, in the first reflective layer and the second reflective layer, the size of each reflecting region and the size of each transmissive region respectively correspond to a column of pixel regions of the display panel.

For example, in the first reflective layer and the second reflective layer, the size of each reflecting region and the size of each transmissive region respectively correspond to a half column of pixel regions on the display panel.

For example, the display panel includes an array substrate, an opposite substrate, a liquid crystal layer arranged between the array substrate and the opposite substrate, and a pixel electrode and a common electrode; and the pixel electrode is arranged on the array substrate, and the common electrode is arranged on the array substrate or the opposite substrate.

For example, orientations of liquid crystal molecules in the liquid crystal layer are perpendicular to the array substrate and the opposite substrate in the case that no voltage is applied to the display panel.

For example, a first display signal is input into pixel regions of the display panel corresponding to the transmissive regions of the second reflective layer, and a second display signal which is different from the first display signal is input into the pixel regions of the display panel corresponding to the transmissive regions of the first reflective layer.

For example, a same display signal is input into pixel regions of the display panel corresponding to the transmissive regions of the second reflective layer and pixel regions of the display panel corresponding to the transmissive regions of the first reflective layer.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make the objective, technical solutions, and advantages of the present disclosure clearer, the technical solutions in the embodiments of the present disclosure are described more clearly and completely hereinafter in conjunction with the accompanying drawings. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1:
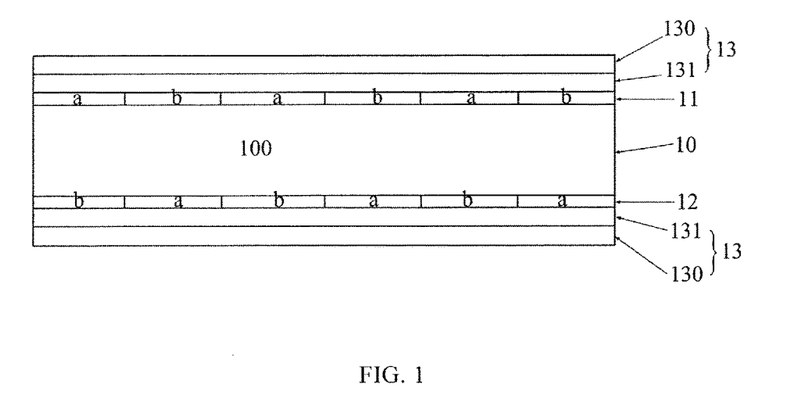
FIG. 1 is a schematic view illustrating a double-sided display according to embodiments of the present disclosure.

Embodiments of the present disclosure provide a double-sided display. FIG. 1 is a schematic view illustrating the double-sided display according to the embodiments of the present disclosure. As shown in FIG. 1, the double-sided display comprises a display panel 10, and a first reflective layer 11 and a second reflective layer 12 respectively arranged on both sides of the display panel 10, and light conversion layers 13 arranged on an outer side of the first reflective layer 11 and an outer side of the second reflective layer 12. The first reflective layer 11 includes transmissive regions a and reflecting regions b, and the second reflective layer includes transmissive regions a and reflecting regions b; the transmissive regions a of the first reflective layer 11 correspond to the reflecting regions b of the second reflective layer 12, and the reflecting regions b of the first reflective layer 11 correspond to the transmissive regions a of the second reflective layer 12. The light conversion layers 13 are configured to convert an incident ambient light to a linearly polarized light, and convert the linearly polarized light to a left-circularly polarized light and filter out a right-circularly polarized light. For example, the light conversion layer 13 includes a polarizer 130 and a quarter-wave plate 131, and the polarizer 130 is located on an outer side of the light conversion layer 13, and the quarter-wave plate 131 is located between the polarizer 130 and the display panel 10.

It should be noted that, the outer side of the first reflective layer 11 is a side of the first reflective layer 11 away from the display panel 10; and the outer side of the second reflective layer 12 is a side of the second reflective layer 12 away from the display panel 10.

It should be noted that, for the light conversion layer 13 arranged on the outer side of the first reflective layer 11, an inner side thereof is a side facing the first reflective layer 11, and an outer side thereof is a side away from the first reflective layer 11.

It should be noted that, for the light conversion layer 13 arranged on the outer side of the second reflective layer 12, an inner side thereof is a side facing the second reflective layer 12, and an outer side thereof is a side away from the second reflective layer 12.

Hereinafter, a principle of realizing a reflective type double-sided display by the double-sided display according to the embodiments of the present disclosure is described in detail in conjunction with the accompanying drawings.

Figure 2:
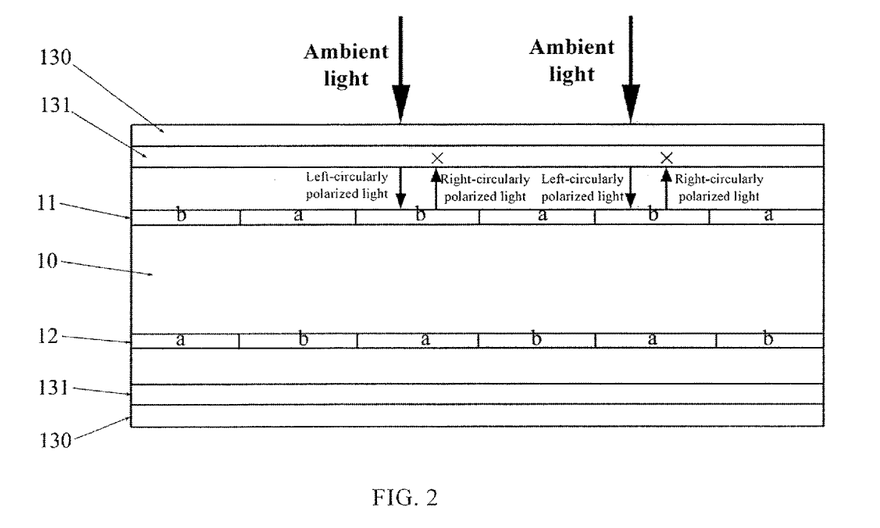
FIG. 2 is a schematic view illustrating a propagation path of the light irradiating to reflecting regions of a first reflective layer.
Figure 3:
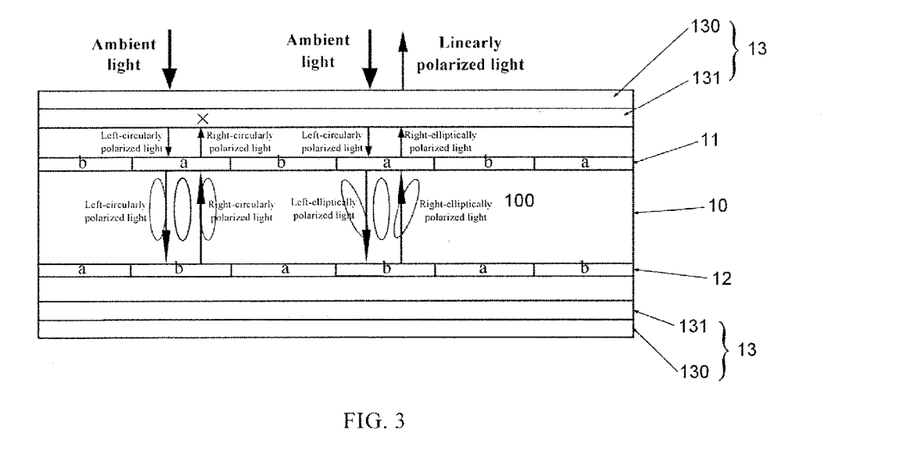
FIG. 3 is a schematic view illustrating a propagation path of the light irradiating to transmissive regions of the first reflective layer.

As shown in FIG. 2 and FIG. 3, the first reflective layer 11 is located above the display panel 10, and the second reflective layer 12 is located below the display panel 10. In the case that the ambient light is incident from an upper side of the double-sided display, the ambient light enters the light conversion layer 13 at first, and passes the polarizer 130 and the quarter-wave plate 131 sequentially; the ambient light is changed to the linearly polarized light after passing the polarizer 130, and the linearly polarized light is changed to the left-circularly polarized light after passing the quarter-wave plate 131; and the left-circularly polarized light irradiates to the transmissive regions a and the reflecting regions b of the first reflective layer 11. Similarly, not shown in the diagrams, in the case that the ambient light is incident from a lower side of the double-sided display, the ambient light also enters the light conversion layer 13 at first, and passes the polarizer 130 and the quarter-wave plate 131 sequentially; the ambient light is changed to the linearly polarized light after passing the polarizer 130, and the linearly polarized light is changed to the left-circularly polarized light after passing the quarter-wave plate 131; and the left-circularly polarized light irradiates to the transmissive regions a and the reflecting regions b of the second reflective layer 12.

Propagation process and path of the light incident from the upper side of the double-sided display is similar to propagation process and path of the light incident from the lower side of the double-sided display. The propagation process and path of the light incident from the upper side of the double-sided display are described in detail hereinafter, to describe the propagation process and path of the light in the double-sided display and a principle of realizing the double-sided display.

Figure 8:
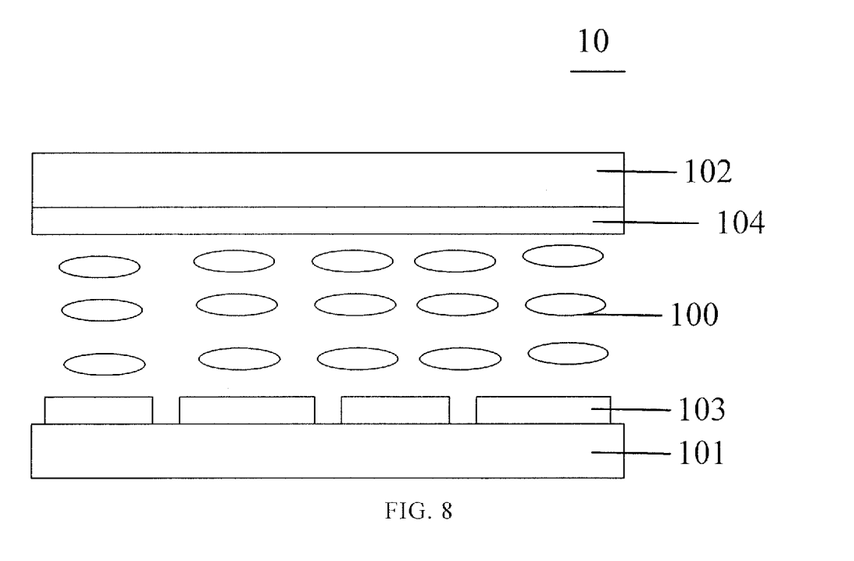
FIG. 8 is a schematic view illustrating a display panel of the double-sided display according to the embodiments of the present disclosure.

As shown in FIG. 3, the left-circularly polarized light irradiating to the transmitting regions a of the first reflective layer 11 irradiates downwards into the display panel 10. For example, the display panel 10 is a liquid crystal display panel. For example, as shown in FIG. 8, the liquid crystal display panel includes an array substrate 101, an opposite substrate 102, a liquid crystal layer 100 arranged between the array substrate 101 and the opposite substrate 102, and a pixel electrode 103 and a common electrode 104; the pixel electrode 103 is arranged on the array substrate 101, and the common electrode 104 is arranged on the array substrate 101 or the opposite substrate 102. In FIG. 8, as an example, it shows a case where the common electrode 104 is arranged on the opposite substrate 102. As for the display panel 10, a deflection angle of liquid crystal molecules in the liquid crystal layer 100 is changed by applying voltages to the pixel electrode 103 and the common electrode 104, so that a transmittance of light passing the liquid crystal layer 100 is changed. In the embodiments of the present disclosure, in the transmissive regions a of the first reflective layer 11, the left-circularly polarized light irradiates downwards into the liquid crystal layer 100; in the case that the voltages applied to the pixel electrode 103 and the common electrode 104 cause the liquid crystal molecules in the liquid crystal layer 100 to be vertically arranged (that is, orientations of the liquid crystal molecules are perpendicular to the array substrate 101 and the opposite substrate 102), the left-circularly polarized light totally passes the liquid crystal layer 100 (i.e., the transmittance of the left-circularly polarized light is equal to or approximate to 100% at the time of passing the liquid crystal layer 100), a phase of the left-circularly polarized light is not be changed, and the left-circularly polarized light is still the left-circularly polarized light; the left-circularly polarized light passing the liquid crystal layer 100 continuously irradiates downwards and then is reflected to the upper side by the reflecting regions b of the second reflective layer 12, and the phase of the light is changed so that the light is changed to be the right-circularly polarized light after the light is reflected; since the liquid crystal molecules in the liquid crystal layer 100 are vertically arranged, the right-circularly polarized light irradiating to the upper side totally passes the liquid crystal layer 100, and continuously passes the transmissive regions a of the first reflective layer 11, to irradiate to the quarter-wave plate 131 and be filtered out by the quarter-wave plate 131. Thus, in the transmissive regions a of the first reflective layer 11, no light irradiates to the upper side, and at this moment, the transmissive regions a of the first reflective layer 11 are in a dark state.

In addition, in the transmissive regions a of the first reflective layer 11, for example, the voltages applied to the pixel electrode 103 and the common electrode 104 do not cause the liquid crystal molecules in the liquid crystal layer 100 to be vertically arranged, that is, the liquid crystal molecules are arranged obliquely with respect to the array substrate 101 and the opposite substrate 102. In this case, a phase of the left-circularly polarized light is changed so that the left-circularly polarized light is changed to be a left-elliptically polarized light after passing the liquid crystal layer 100, and the transmittance of the left-circularly polarized light changes according to different angles of the liquid crystal molecules; the left-elliptically polarized light irradiates downwards and is reflected to the upper side by the reflecting regions b of the second reflective layer 12, and the phase of the light after being reflected is changed so that the left-elliptically polarized light is changed to a right-elliptically polarized light; the right-elliptically polarized light irradiates to the upper side and passes the liquid crystal layer 100, and the transmittance of the right-elliptically polarized light at the time of passing the liquid crystal layer 100 changes according to different angles of the liquid crystal molecules 100, the phase of the right-elliptically polarized light is changed after passing the liquid crystal layer but the right-elliptically polarized light is still the right-elliptically polarized light; the right-elliptically polarized light continuously irradiates to the upper side to pass the display panel 10, and then pass the transmissive regions a of the first reflective layer 11 to irradiate to the quarter-wave plate; since the right-elliptically polarized light is not the right-circularly polarized light, part of the right-elliptically polarized light passes the quarter-wave plate 131 to irradiate to the polarizer 130 and pass the polarizer 130 finally, and the light after passing the polarizer 130 is the linearly polarized light.

It can be known from the above descriptions that, for a case where the ambient light is incident from the upper side of the double-sided display, the transmissive regions a of the first reflective layer 11 are controlled not to emit light to the upper side of the double-sided display by controlling the voltages applied to the pixel electrode 103 and the common electrode 104 of the display panel 10, so that the transmissive regions a of the first reflective layer 11 presents a "dark state"; and the transmissive regions a of the first reflective layer 11 are controlled to emit light to the upper side of the double-sided display and the brightness of the emitted light is controlled by controlling the voltages applied to the pixel electrode 103 and the common electrode 104 of the display panel 10, so that the transmissive regions a of the first reflective layer 11 display different brightness. That is to say, on the upper side of the double-sided display, a viewer sees an image displayed in a region corresponding to the transmissive regions a of the first reflective layer 11 (which corresponds to the reflecting regions b of the second reflective layer 12). At this time, the transmissive regions a of the first reflective layer 11 are in a bright state.

As shown in FIG. 2 and FIG. 3, in the light incident from the upper side of the double-sided display, the left-circularly polarized light irradiating to the reflecting regions b of the first reflective layer 11 is reflected to the upper side and changed to the right-circularly polarized light. It can be known from the above descriptions that, the quarter-wave plate 131 allows the left-circularly polarized light to pass and filters out the right-circularly polarized light; and therefore, the right-circularly polarized light irradiating to the upper side does not pass the quarter-wave plate 131, and further does not be emitted from the upper side of the double-sided display. Thus, as for a display surface on the upper side of the double-sided display, the reflecting regions b of the first reflective layer 11 are "dark regions" instead of "regions emitting the reflected light", so a normal display effect is not affected.

Similarly, for a case where the ambient light is incident from the lower side of the double-sided display, whether regions corresponding to the transmissive regions a of the second reflective layer 12 (which corresponds to the reflecting regions b of the first reflective layer 11) emit light to the lower side of the double-sided display or not and a brightness of the emitted light are controlled by controlling the voltages applied to the pixel electrode 103 and the common electrode 104 of the display panel 10; and therefore, a display surface is formed on the lower side of the double-sided display, and the viewer sees an image displayed in a region corresponding to the transmissive regions a of the second reflective layer 12 on the lower side of the double-sided display. Furthermore, a "dark region" is formed in a region corresponding to the reflecting regions b of the second reflective layer 12, so that no adverse influence is caused to a display effect of the display surface of the lower side.

In the embodiments described above, the light conversion layer 13 converts the linearly polarized light to the left-circularly polarized light and filters out the right-circularly polarized light through the quarter-wave plate 131. However, it should be noted that, in the embodiments of the present disclosure, the light conversion layer for example is configured to convert the incident ambient light to the linearly polarized light, and convert the linearly polarized light to the right-circularly polarized light and filter out the left-circularly polarized light; and in this case, the double-sided display is realized as well.

For example, in the first reflective layer 11 and the second reflective layer 12, the reflecting regions b and the transmissive regions a are arranged alternately. The alternate arrangement of the reflecting regions b and the transmissive regions a reduces a chance of seeing the dark region, which is not used for displaying, on each display surface by eyes of the viewer, so as to ensure the display effect.

For example, a size of each reflecting region b and a size of each transmissive region a respectively correspond to an integral number of pixel regions of the display panel 10.

Figure 4:
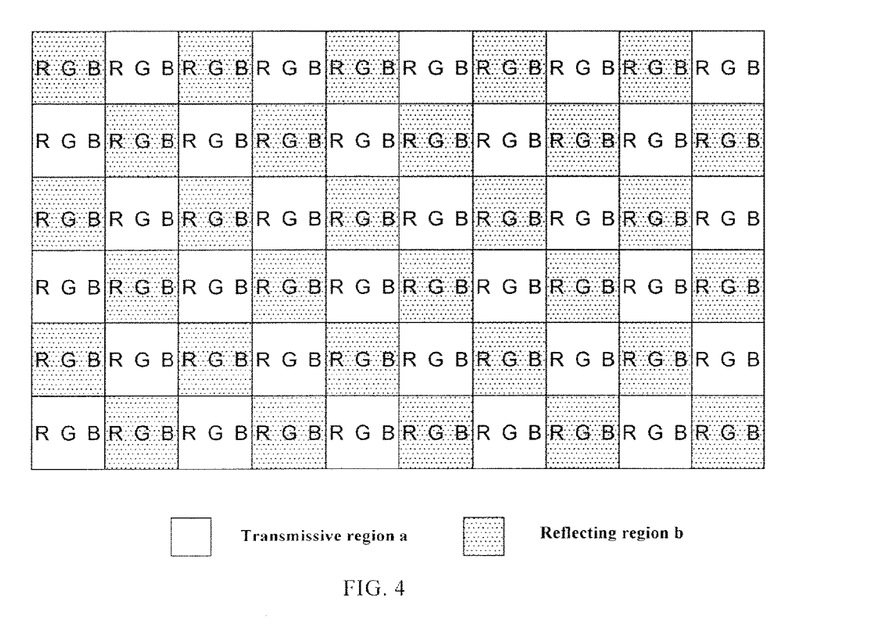
FIG. 4 is a schematic view illustrating a case that each transmissive region corresponds to one pixel region and each reflecting region corresponds to one pixel region.

For example, in the first reflective layer 11 and the second reflective layer 12, the size of each reflecting region b and the size of each transmissive region a respectively correspond to one pixel region of the display panel 10, as shown in FIG. 4. In this way, on each display surface, a size of the "dark region" which is not used for displaying is equal to a size of a minimum display unit (i.e. a pixel point), so that a chance of seeing the "dark region" described above by the viewer is minimized, and the display effect is maximally ensured. For example, as shown in FIG. 4, the pixel region includes three sub-pixel regions. For example, the three sub-pixel regions are a red sub-pixel region (R), a green sub-pixel region (G) and a blue sub-pixel region (B).

Figure 5:
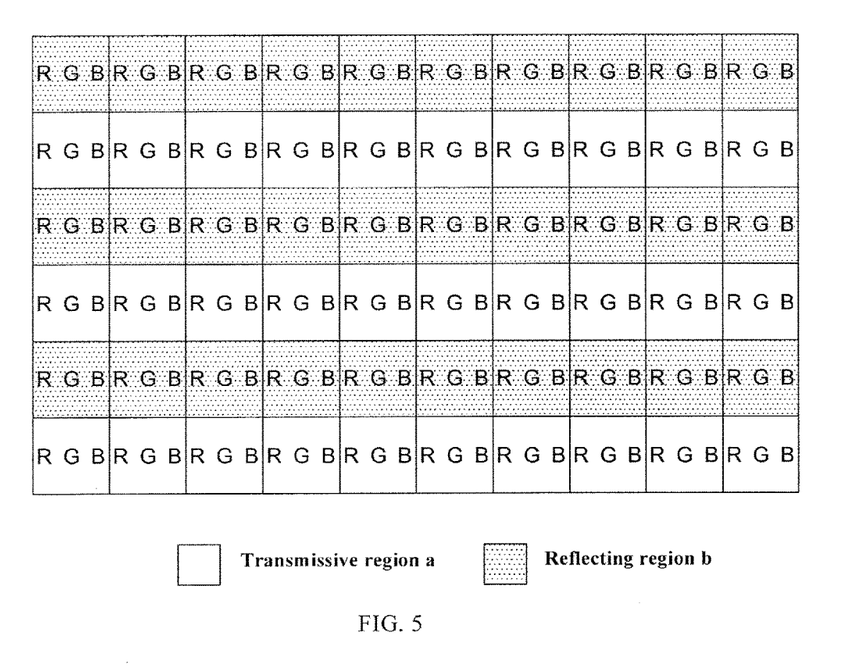
FIG. 5 is a schematic view illustrating a case that each transmissive region corresponds to a row of pixel regions and each reflecting region corresponds to a row of pixel regions.

For example, in the first reflective layer 11 and the second reflective layer 12, the size of each reflecting region b and the size of each transmissive region a respectively correspond to a row of pixel regions of the display panel 10, as shown in FIG. 5. In this way, on each display surface, a width of the "dark region" which is not used for displaying is equal to a width of the minimum display unit (i.e., the pixel point), so that a chance of seeing the "dark region" described above by the viewer is reduced, so as to ensure the display effect.

Figure 6:
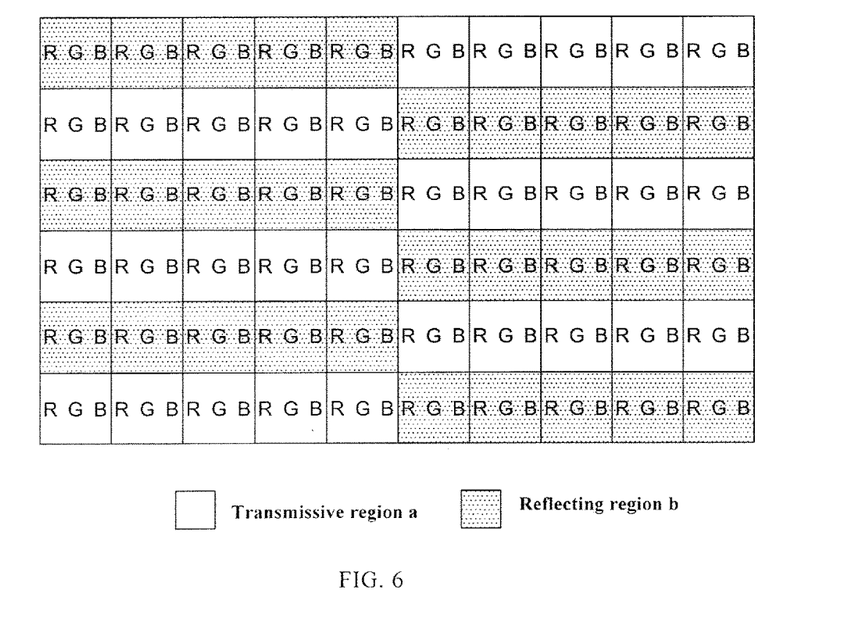
FIG. 6 is a schematic view illustrating a case that each transmissive region corresponds to a half row of pixel regions and each reflecting region corresponds to a half row of pixel regions.

For example, in the first reflective layer 11 and the second reflective layer 12, the size of each reflecting region b and the size of each transmissive region a respectively correspond to a half row of pixel regions of the display panel 10, as shown in FIG. 6.

Figure 7:
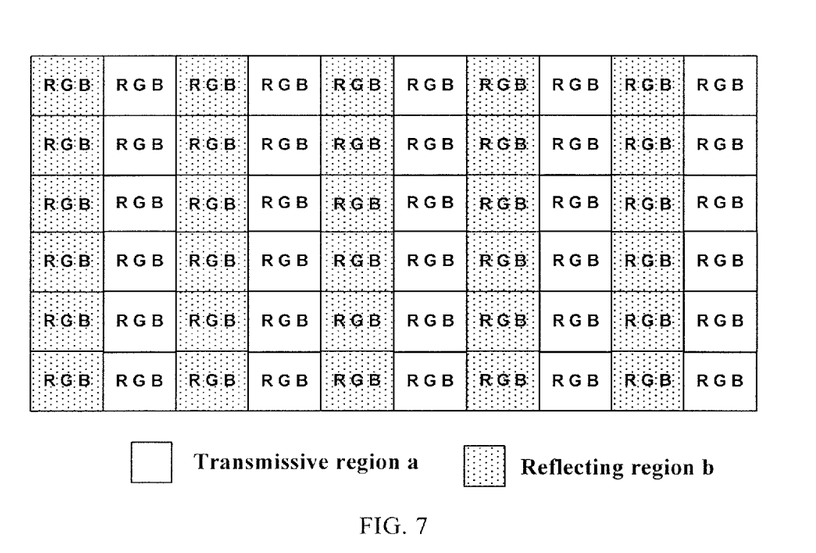
FIG. 7 is a schematic view illustrating a case that each transmissive region corresponds to a column of pixel regions and each reflecting region corresponds to a column of pixel regions.

For example, in the first reflective layer 11 and the second reflective layer 12, the size of each reflecting region b and the size of each transmissive region a respectively correspond to a column of pixel regions of the display panel 10, as shown in FIG. 7; or, in the first reflective layer 11 and the second reflective layer 12, the size of each reflecting region b and the size of each transmissive region a respectively correspond to a half column of pixel regions of the display panel 10.

For example, orientations of liquid crystal molecules in the liquid crystal layer 100 are perpendicular to the array substrate and the opposite substrate in the case that no voltage is applied to the display panel. As described above, in the case that orientations of liquid crystal molecules in the liquid crystal layer 100 are perpendicular to the array substrate and the opposite substrate, the regions corresponding to the transmissive regions a of the first reflective layer 11 and the reflecting regions b of the second reflective layer 12 do not emit light to the display surface on the upper side of the double-sided display, and the regions corresponding to the reflecting regions b of the first reflective layer 11 and the transmissive regions a of the second reflective layer 12 do not emit light to the display surface on the lower side of the double-sided display. Therefore, in the case that the double-sided display is turned off, the display surface on the upper side and the display surface on the lower side display black, that is, it is ensured that the double-sided display is in a normally black mode.

It can be known from the above descriptions that, the display regions of the display surface on the upper side of the double-sided display are regions corresponding to the transmissive regions a of the first reflective layer 11 and the reflecting regions b of the second reflective layer 12, the display regions of the display surface on the lower side are regions corresponding to the reflecting regions b of the first reflective layer 11 and the transmissive regions a of the second reflective layer 12, and the display regions of the display surface on the upper side and the display regions of the display surface on the lower side are not overlapped with each other.

For example, in the embodiments of the present disclosure, a display signal input into the pixel regions of the display panel corresponding to the display regions of the display surface on the upper side and a display signal input into the pixel regions of the display panel corresponding to the display regions of the display surface on the lower side are independent from each other, so that the display surface on the upper side and the display surface on the lower side display independently from each other, and thus an image displayed by the display surface on the upper side and an image displayed by the display surface on the lower side are different from each other. For example, a first display signal is input into the pixel regions of the display panel corresponding to the transmissive regions a of the second reflective layer 12 (i.e., the display regions of the display surface on the lower side), and a second display signal which is different from the first display signal is input into the pixel regions of the display panel corresponding to the transmissive regions a of the first reflective layer 11 (i.e. the display regions of the display surface on the upper side). In this way, the display surface on the upper side and the display surface on the lower side display separately, so as to display different images.

In some application cases, the display surface on the upper side and the display surface on the lower side of the double-sided display are required to display a same image; in this case, a same display signal is input into the pixel regions of the display panel corresponding to the transmissive regions a of the second reflective layer 12 (i.e., the display regions of the display surface on the lower side) and the pixel regions of the display panel corresponding to the transmissive regions a of the first reflective layer 11 (i.e., the display regions of the display surface on the upper side), so that the display surface on the upper side and the display surface on the lower side in the double-sided display display a same image.

The double-sided display according to the embodiments of the present disclosure comprises: the display panel 10, the first reflective layer 11 and the second reflective layer 12 respectively arranged on both sides of the display panel 10, and the light conversion layers 13 arranged on the outer side of the first reflective layer 11 and the outer side of the second reflective layer 12. The first reflective layer 11 includes the transmissive regions a and the reflecting regions b, the second reflective layer includes the transmissive regions a and the reflecting regions b; the transmissive regions a of the first reflective layer 11 correspond to the reflecting regions b of the second reflective layer 12, and the reflecting regions b of the first reflective layer 11 correspond to the transmissive regions a of the second reflective layer 12. The light conversion layers 13 are configured to convert the incident ambient light to the linearly polarized light, and convert the linearly polarized light to the left-circularly polarized light and filter out the right-circularly polarized light; or, the light conversion layers 13 are configured to convert the incident ambient light to the linearly polarized light, and convert the linearly polarized light to the right-circularly polarized light and filter out the left-circularly polarized light. The double-sided display according to the embodiments of the present disclosure only needs one display panel to realize the double-sided display, so that a thickness and weight of the double-sided display are reduced, and requirements on making it light and thin are met.

It should be noted that, for the double-sided display according to the embodiments of the present disclosure, the ambient light is employed for displaying, so it is not necessary to provide a backlight.

The foregoing embodiments merely are exemplary embodiments of the present disclosure, and not intended to define the scope of the present disclosure, and the scope of the disclosure is determined by the appended claims.

The present application claims priority of Chinese Patent Application No. 201610016214.7 filed on Jan. 11, 2016, the present disclosure of which is incorporated herein by reference in its entirety as part of the present application.

The invention claimed is:

1. A double-sided display, comprising: a display panel, and a first reflective layer and a second reflective layer respectively arranged on both sides of the display panel, and a light conversion layer respectively arranged on an outer side of the first reflective layer and an outer side of the second reflective layer, wherein
the first reflective layer includes transmissive regions and reflecting regions, the second reflective layer includes transmissive regions and reflecting regions, the transmissive regions of the first reflective layer correspond to the reflecting regions of the second reflective layer, and the reflecting regions of the first reflective layer correspond to the transmissive regions of the second reflective layer,
the light conversion layer is configured to convert an incident ambient light to a linearly polarized light, and convert the linearly polarized light to a right-circularly polarized light and filter out a left-circularly polarized light; or, the light conversion layer is configured to convert an incident ambient light to a linearly polarized light, and convert the linearly polarized light to a left-circularly polarized light and filter out a right-circularly polarized light.

2. The double-sided display according to claim 1, wherein, the light conversion layer includes a polarizer and a quarter-wave plate, the polarizer is located on an outer side of the light conversion layer, and the quarter-wave plate is located between the polarizer and the display panel.

3. The double-sided display according to claim 1, wherein, in the first reflective layer and the second reflective layer, the reflecting regions and the transmissive regions are arranged alternately.

4. The double-sided display according to claim 1, wherein, in the first reflective layer and the second reflective layer, a size of each reflecting region and a size of each transmissive region respectively correspond to an integral number of pixel regions of the display panel.

5. The double-sided display according to claim 4, wherein, in the first reflective layer and the second reflective layer, the size of each reflecting region and the size of each transmissive region respectively correspond to one pixel region of the display panel.

6. The double-sided display according to claim 4, wherein, in the first reflective layer and the second reflective layer, the size of each reflecting region and the size of each transmissive region respectively correspond to a row of pixel regions of the display panel.

7. The double-sided display according to claim 4, wherein, in the first reflective layer and the second reflective layer, the size of each reflecting region and the size of each transmissive region respectively correspond to a half row of pixel regions of the display panel.

8. The double-sided display according to claim 4, wherein, in the first reflective layer and the second reflective layer, the size of each reflecting region and the size of each transmissive region respectively correspond to a column of pixel regions of the display panel.

9. The double-sided display according to claim 4, wherein, in the first reflective layer and the second reflective layer, the size of each reflecting region and the size of each transmissive region respectively correspond to a half column of pixel regions on the display panel.

10. The double-sided display according to claim 1, wherein, the display panel includes an array substrate, an opposite substrate, a liquid crystal layer arranged between the array substrate and the opposite substrate, and a pixel electrode and a common electrode; and
the pixel electrode is arranged on the array substrate, and the common electrode is arranged on the array substrate or the opposite substrate.

11. The double-sided display according to claim 10, wherein, orientations of liquid crystal molecules in the liquid crystal layer are perpendicular to the array substrate and the opposite substrate in the case that no voltage is applied to the display panel.

12. The double-sided display according to claim 1, wherein, a first display signal is input into pixel regions of the display panel corresponding to the transmissive regions of the second reflective layer, and a second display signal which is different from the first display signal is input into pixel regions of the display panel corresponding to the transmissive regions of the first reflective layer.

13. The double-sided display according to claim 1, wherein, a same display signal is input into pixel regions of the display panel corresponding to the transmissive regions of the second reflective layer and pixel regions of the display panel corresponding to the transmissive regions of the first reflective layer.

* * * * *